US008799635B2

(12) United States Patent
Smith et al.

(10) Patent No.: US 8,799,635 B2
(45) Date of Patent: Aug. 5, 2014

(54) INTELLIGENT APPLICATION RECOMMENDATION FEATURE

(75) Inventors: Spencer Lewis Smith, Raleigh, NC (US); Adam Robert Geiger, Cary, NC (US); Kevin Glynn Paterson, San Antonio, TX (US)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 13/359,141

(22) Filed: Jan. 26, 2012

(65) Prior Publication Data

US 2013/0198506 A1 Aug. 1, 2013

(51) Int. Cl.
G06F 1/24 (2006.01)
H04M 1/725 (2006.01)
G06F 3/0481 (2013.01)

(52) U.S. Cl.
CPC ....... H04M 1/72569 (2013.01); G06F 3/04817 (2013.01)
USPC ....................................................... 713/100

(58) Field of Classification Search
CPC ........................ G06F 3/04817; H04M 1/72569
USPC ....................................................... 713/100
See application file for complete search history.

(56) References Cited

U.S. PATENT DOCUMENTS

| 6,742,015 B1 | 5/2004 | Bowman-Amuah |
| 6,842,906 B1 | 1/2005 | Bowman-Amuah |
| 7,614,001 B2 | 11/2009 | Abbott et al. |
| 7,734,780 B2 | 6/2010 | Abbott et al. |
| 8,032,468 B2 * | 10/2011 | Song et al. ................ 706/17 |
| 8,620,764 B2 * | 12/2013 | Moritz et al. ............ 705/26.1 |
| 2007/0191100 A1 | 8/2007 | Counts |
| 2007/0300063 A1 | 12/2007 | Adams et al. |
| 2013/0014040 A1 * | 1/2013 | Jagannathan et al. ........ 715/765 |
| 2013/0238540 A1 * | 9/2013 | O'Donoghue et al. ......... 706/46 |

OTHER PUBLICATIONS

Chan et al., "MobiPADS: A Reflective Middleware for Context-Aware Mobile Computing," IEEE Transactions on Software Engineering, vol. 29, No. 12 Dec. 2003, pp. 1072-1085.
Dey et al., "The Conference Assistant: Combining Context-Awareness with Wearable Computing," Proceedings of the 3rd International Symposium on Wearable Computers, San Francisco, CA Oct. 20-22, 1999, pp. 21-28.

(Continued)

Primary Examiner — Albert Wang
(74) Attorney, Agent, or Firm — Charles L. Moore; Moore & Van Allen PLLC

(57) ABSTRACT

A method for making intelligent application and setting recommendations may include determining, by a device, a current context of a user of the device in response to the device being one of unlocked and turned-on. The method may also include determining, by the device, if the current context of the user has changed from a previous context of the user at a time when the device was one of locked and turned-off. The method may additionally include presenting a recommendation on a display of the device. The recommendation may include at least one of an application for operation on the device, options for operation of the device, and operating settings of the device, based on the current context of the user, in response to determining that the current context of the user has changed from the previous context.

20 Claims, 5 Drawing Sheets

(56) References Cited

OTHER PUBLICATIONS

Flanagan et al., "A Hierarchical Approach to Learning Context and Facilitating User Interaction in Mobile Devices," Artificial Intelligence in Mobile Systems 2003 (in conjunction with Ubicomp 003), Oct. 12, Seattle WA, pp. 8 pgs.

Pascoe, "Adding Generic Contextual Capabilities to Wearable Computers," in the digest of papers of the 2nd Intl. Symposium on Wearable Computers: pp. 92-99.

Smailagic et al., "Towards Context Aware Computing: Experiences and Lessons," Intelligent Systems, IEEE May-Jun. 2001, 10 pgs.

* cited by examiner

FIG. 2

| CONTEXT | GPS | CAMERA | MICROPHONE | COMPASS | ACCELEROMETER | WEATHER | TIME | BAROMETER | ETC. |
|---|---|---|---|---|---|---|---|---|---|
| WALKING | | | | | | | | | |
| DRIVING | | | | | | | | | |
| FLYING | | | | | | | | | |
| KITCHEN | | | | | | | | | |
| WATCHING TV | | | | | | | | | |
| DRIVING | | | | | | | | | |
| SHOPPING | | | | | | | | | |

FIG. 3

| CONTEXT | OPEN APPS | BACKGROUND APPS | USER INTERFACE LAYOUT | SCREEN BRIGHTNESS | FONT SIZE | ETC. |
|---|---|---|---|---|---|---|
| WALKING | | | | | | |
| DRIVING | | | | | | |
| FLYING | | | | | | |
| KITCHEN | | | | | | |
| WATCHING TV | | | | | | |
| SHOPPING | | | | | | |

# INTELLIGENT APPLICATION RECOMMENDATION FEATURE

BACKGROUND

Aspects of the present invention relate to mobile devices, communications devices, computing devices, combinations of such devices and the like, and more particularly to an intelligent application recommendation feature for such devices.

Mobile devices, such as mobile communications devices including smartphones and similar device are becoming ubiquitous and new applications or "apps," as applications or programs for such devices are becoming commonly known, are continuously being introduced that greatly expand the use and functionality of these devices in various user contexts or activities in which a user may be involved and environments where a user may be located. These mobile devices typically have a touch screen and a screen locking function or screen inactivation function or feature to prevent accidental input to the device via the touch screen. The device may not always be manually locked by a user. For example, the device may include a feature, such as a time out feature where after a preset period of time the device may time out and automatically lock the touch screen to prevent accidental input. Or there may be other criteria where the touch screen may be automatically locked or inactivated to prevent input or access to the device. When a user unlocks the device at a later time, the user's current context or activity may have changed. Accordingly, open or active applications and settings when the touch screen was locked or inactivated may no longer be pertinent based on the current context of the user.

BRIEF SUMMARY

According to an aspect of the present invention, a method for making intelligent application and setting recommendations may include determining, by a device, a current context of a user of the device in response to the device being one of unlocked or turned-on. The method may also include determining, by the device, if the current context of the user has changed from a previous context of the user at a time when the device was one of locked or turned-off. The method may additionally include presenting an intelligent device usage setting recommendation on a display of the device. The recommendation may include at least one of an application for operation on the device, options for operation of the device, and operating settings of the device, based on the current context of the user, in response to determining that the current context of the user has changed from the previous context.

According to another aspect of the present invention, a device may include a processor and an intelligent application and settings recommendation module operable on the processor. The intelligent application and settings module may include a module or unit to determine a current context of a user of the device in response to the device being one of unlocked or turned-on. The intelligent application and settings module may also include a module or unit to determine if the current context of the user has changed from a previous context of the user at a time when the device was one of locked or turned-off. The intelligent application and settings module may additionally include a module to present an intelligent device usage recommendation on a display of the device. The recommendation may include at least one of an application for operation on the device, options for operation of the device, and operating settings of the device, based on the current context of the user, in response to determining that the current context of the user has changed from the previous context.

According to a further aspect of the present invention, a computer program product for making intelligent application and setting recommendations may include a computer readable storage medium having computer readable program code embodied therewith. The computer readable program code may include computer readable program code configured to determine a current context of a user of the device in response to the device being one of unlocked or turned-on. The computer readable program code may also include computer readable program code configured to determine if the current context of the user has changed from a previous context of the user at a time when the device was one of locked or turned-off. The computer readable program code may additionally include computer readable program code configured to present an intelligent usage setting recommendation on a display of the device. The recommendation may include at least one of an application for operation on the device, options for operation of the device, and operating settings of the device, based on the current context of the user, in response to determining that the current context of the user has changed from the previous context.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIG. 2 is an example of a table for storing context data for determining a context of the user in accordance with an embodiment of the present invention.

FIG. 3 is an example of a table for storing a device usage setting data and an associated user context in accordance with an embodiment of the present invention.

DETAILED DESCRIPTION

Figure 1A:
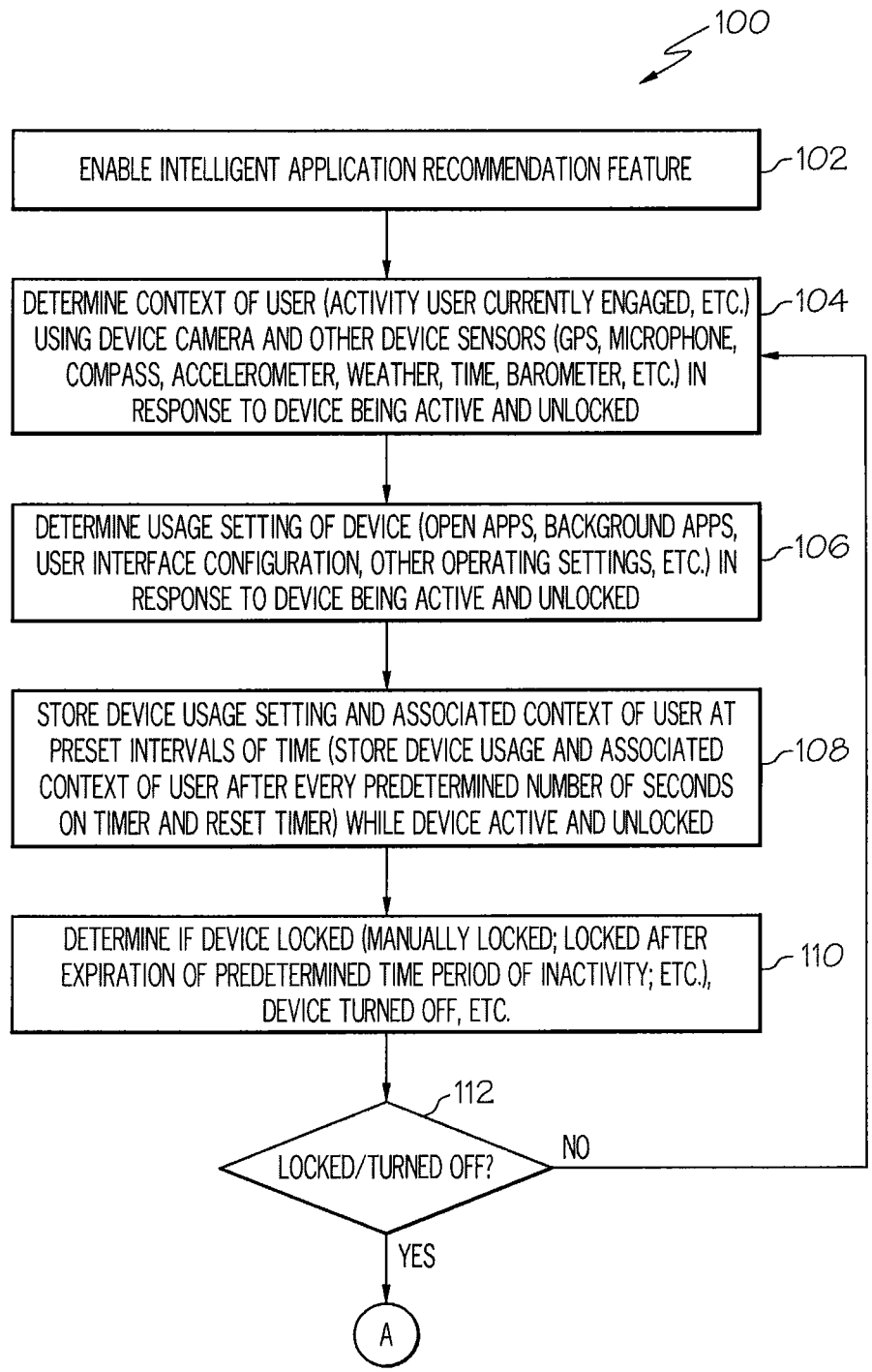
FIGS. 1A and 1B (collectively FIG. 1) are a flow chart of an example of a method for making intelligent application, option and setting recommendations in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As used herein device or mobile device may be any mobile device, mobile communications device, computing device or any other type of device capable of performing the functions and operations described herein as well as other functions, such as communications, computing or similar functions. Examples of the device or mobile device may include but is not necessarily limited to a mobile cellular phone, smartphone or similar device.

Most mobile devices are equipped with a camera or cameras that are built into the device itself. In many instances the device may include a camera on a front and back side of the device and may include other sensory devices. Examples of other sensory devices may include but is not necessarily limited to a global positioning sensory device, such as a global positioning system (GPS) to determine a geographic location of the device, an accelerometer to detect movement of the device, a compass to determine a direction of movement of the device, a microphone to receive sounds or acoustic signals and a clock to determine the time of the day based on the geographic location. The camera and sensors may be used to determine the user's last moment of focus and context when using the device. The user context may be defined by an activity the user is involved, an environment or location where the user is located, a combination of this information or data and any other information that may define a context of the user. This information may be stored on the device and used to intelligently present to the user by the device an appropriate application or applications, options and operating settings upon unlocking or turning-on the device.

Whether the device is locked manually or automatically (i.e. timed out after a preset time period, for example, two minutes of inactivity by the user), the context of the user may be captured. The context of the user may be stored including whether the user was walking, running, riding a bike, working in an office or other location, or engaged in some other activity. The user's last context may be determined using the camera or cameras and other sensors or sensory devices of the mobile device. Accordingly, an accurate determination may be made as to the context of the user upon unlocking the device and comparing that context with the user's context at the last usage of the device before locking.

While the device is unlocked, every preset number of seconds a marker may be set for a last actual usage or usage settings of the device along with an associated context of the user. The last actual usage and associated context may be stored in a table where applications and other options may be tracked that are pertinent to a particular mode or context.

The current context of the user is determined in response to the device being unlocked from a locked state and if the user context has changed, the system or method of the present invention may make an intelligent device usage setting recommendation as to which applications, options and settings may be presented based on the current user context. Alternatively, if the context of the user is unchanged in response to unlocking the device, the same applications, options and settings that were open or active when the device locked may be presented and activated.

Figure 1B:
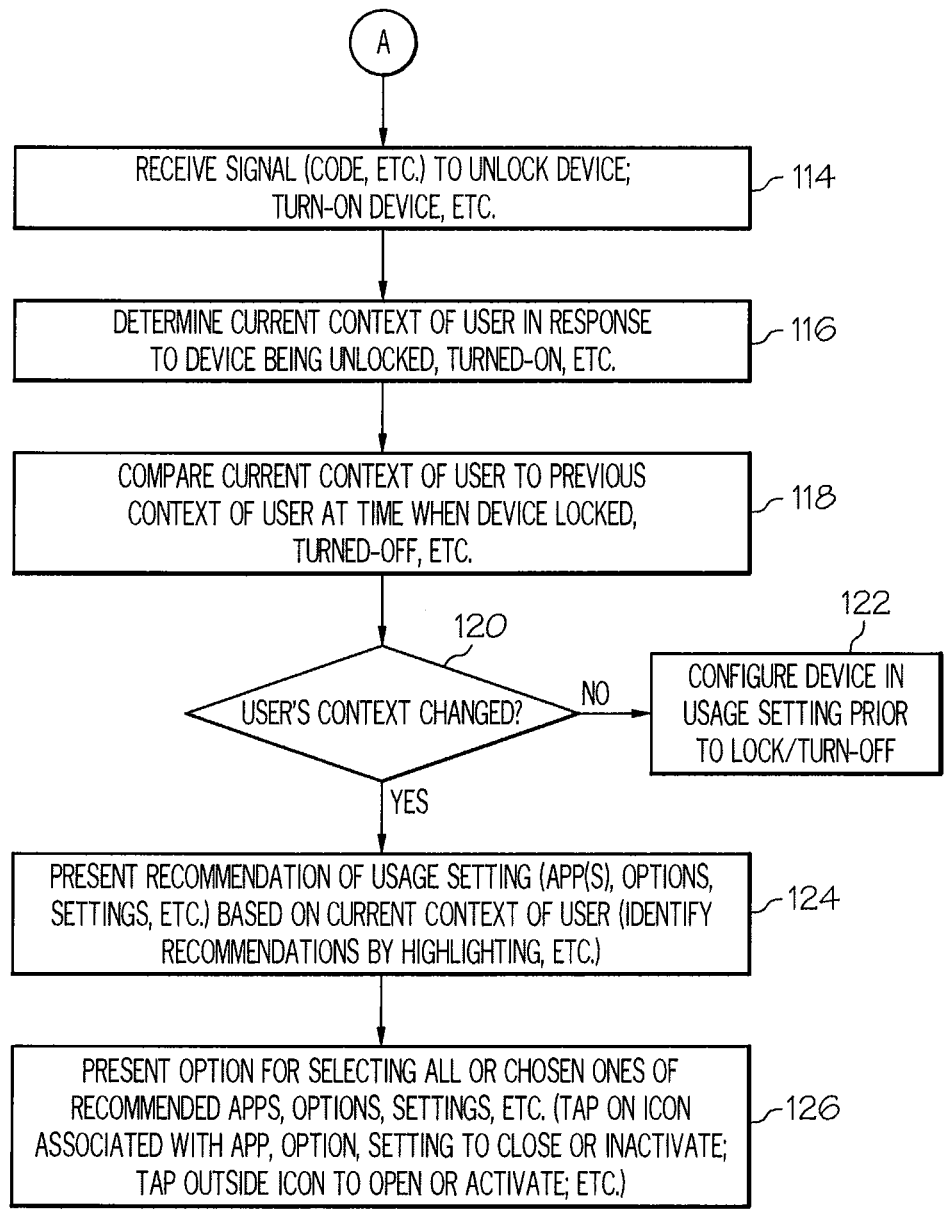

FIGS. 1A and 1B (collectively FIG. 1) are a flow chart of an example of a method 100 for making intelligent application, option and setting recommendations in accordance with an embodiment of the present invention. In block 102, an intelligent application, option and settings recommendation feature or simply intelligent application recommendation feature may be enabled on a device equipped with the feature or module.

In block 104, a current context of the user may be determined. The current context of the user may be determined in response to the device being active and unlocked. The current context of the user may be defined by an activity in which the user is currently engaged, a geographic location of the user or other information related to the user that may define the current context of the user.

The current context of the user may be determined using a camera or cameras mounted in the device and/or other sensors or sensory devices associated with the mobile device. For example, as previously discussed, the mobile device may include a camera on opposite front and back sides of the device. The cameras may be activated and collect a plurality of images of the surroundings or environment where the device and user are located. The current context of the user may then be determined from analysis of the plurality of images.

Examples of the other sensors or sensory devices may include but is not necessarily limited to a global positioning sensory device or GPS to determine a geographic location of the device; an accelerometer to detect movement of the device; a compass to determine a direction of movement of the device; a microphone to receive sounds; and a clock to determine a time of day based on the geographic location of the mobile device. Sounds received by the microphone may be compared to a database of sounds corresponding to different environments or contexts to determine the user's context based on the sounds received by the microphone. A weather application may also be included and activated to determine the local weather at the geographic location of the mobile device. The geographic location of the mobile device may be automatically entered in the weather application to determine the local weather and thus contribute to a determination of the context of the user.

In block 106, a usage setting of the device may be determined in response to the device being active and unlocked. The usage setting of the device may include but is not necessarily limited to open applications or apps, background application or apps, a user interface configuration, other operating settings of the device and similar parameters associated with the device that may be set or adjusted to control operation and functionality of the device. Background applications or apps may be applications that support the functionality or operation of other open applications or background applications.

In block 108, the usage setting and associated context of the user may be stored on the device. The usage setting and the associated context of the user may be stored at preset intervals of time. A timer may be set and the usage and associated context may be stored after a predetermined number of seconds have elapsed on the timer and the timer may be reset for storing the next usage setting and associated context. The usage setting and associated context may also be stored in response to one of the usage setting or the associated context changing while the device is active and unlocked or may be stored in response to the device being manually or automatically locked or turned-off.

Referring also to FIG. 2 and FIG. 3, FIG. 2 is an example of a table 200 for storing context data for determining a context of the user in accordance with an embodiment of the present invention. Different contexts may be listed in a Context column 202. Examples of different user contexts illustrated in FIG. 2 include Walking, Driving, Flying, Kitchen, Watching TV, and Shopping. The present invention is not intended to be limited by the exemplary contexts illustrated in FIG. 2 and other user contexts are within the scope of the present invention. The other columns in table 200 include cells for storing data corresponding to each of the column headings. The exemplary columns shown in FIG. 2 include a GPS column 204, a Camera column 206, a Microphone column 208, a Compass column 210, an Accelerometer column 212, a Weather column 214, a Time column 216, a Barometer column 218, and an etc. column 220 for entering any other data that may be used to determine a context of the user.

As illustrated in the example of FIG. 2, a context may be listed multiple times. For example, Driving is listed twice. There may be different GPS data associated with each of the different Driving contexts.

FIG. 3 is an example of a table 300 for storing a device usage setting data and an associated user context in accordance with an embodiment of the present invention. Examples of different user contexts may be listed in Context column 302. Again, non-limiting examples of the user contexts shown in the example of FIG. 3 include Walking, Driving, Flying, Kitchen, Watching TV, and Shopping. A particular context is stored only once in table 300. The other columns in table 300 include cells for storing data corresponding to each of the different usage setting column headings in association with each of the different user contexts in column 302. Examples of the different columns for storing device usage data in table 300 in association with the different user contexts in column 302 include an Open Apps column 304, a Background Apps column 306, a User Interface Layout column 308, a Screen Brightness column 310, a Font Size column 312, and an Etc. column 314 for storing any other device usage data.

Referring back to FIG. 1A, in block 110, a determination may be made if the device is locked. The device may be manually locked by the user or the device may be locked after expiration of a predetermined time period of inactivity. The device may also be locked based on some other criteria to prevent accidental or unwanted input to the device via a touch screen of the device or keypad.

In block 112, a determination may be made if the mobile device has been locked or turned off. If the mobile device has not been locked or turned off the method 100 may return to block 104 and the method 100 may continue similar to that previously described. If the mobile device has been locked or turned off in block 112, the method 100 may advance to block 114.

In block 114, a receive signal may be received to unlock the device or turn-on the device. The received signal may be a security code, password or other operation to unlock or activate the device.

In block 116, a current context of the user may be determined in response to the device being unlocked or turn-on. The current context of the user may be determined similar to that previously described using the camera or cameras of the device, other sensors of the device or a combination of the cameras and other sensors. In block 118, the current context of the user may be compared to a previous context of the user at a time when the device was locked or turn-off.

In block 120, a determination may be made whether the context of the user has changed from a previous context of the user at a time when the mobile device was locked or turned-off. If the user's context has not changed, the method 100 may advance to block 122. In block 122, the device may be configured corresponding to the usage setting of the device last saved prior to the device being locked or turned-off or the usage setting saved when the mobile device was locked or turned-off.

If the context of the user has changed in block 120 from the previous context when the device was locked or turned off, the method 100 may advance to block 124. In block 124, an intelligent device usage setting recommendation may be presented on a display or touch screen of the device. The intelligent recommendation of the usage setting based on the current context of the user may include but is not necessarily limited to an application or applications for operation on the device, options for operation of the device, and operating settings of the device.

The recommendation of the usage setting or settings may be highlighted or otherwise identified as being recommended. An example of highlighting or otherwise identifying the recommended usage setting or settings will be described with reference to FIG. 4.

In block 126, an option for selecting all or chosen ones of the recommended applications or apps, options, settings or other features may be presented on the display or touch screen of the device. And example of an option for selecting all or chosen ones of the recommended applications or apps will also be described with reference to FIG. 4. For example, in the case of a touch screen, an icon may be presented in association with the application, option or setting. The icon may be "tapped-on" by the finger of a user or otherwise operated as is known in the computing arts to close or inactivate the application, option or setting. A representation of the recommended application, option or setting may be "tapped-on" by the user or otherwise operated outside of the associated icon to open or activate the selected application, option or setting for operation on the device or for configuring the device. Alternatively, the icon could be tapped-on to open or activate the recommended application, option or setting and the representation of the recommended application, option or setting may be tapped-on outside of the icon to close or inactivate the recommended application option or setting.

In another embodiment, the intelligent recommendation of device usage settings may be automatically selected or activated without the user having to select the recommended applications, options, settings or other features. The device may be configured for either automatic implementation of the recommendations or selection by the user similar to that described above. All of recommended device usage settings may also be automatically implemented after a preset time period without the user selecting chosen ones of the recommended applications, options, settings or other features. The device may also be configured so that if none of the recommended device usage settings are selected within the preset time period, the recommendations are dismissed and not activated.

Figure 4:
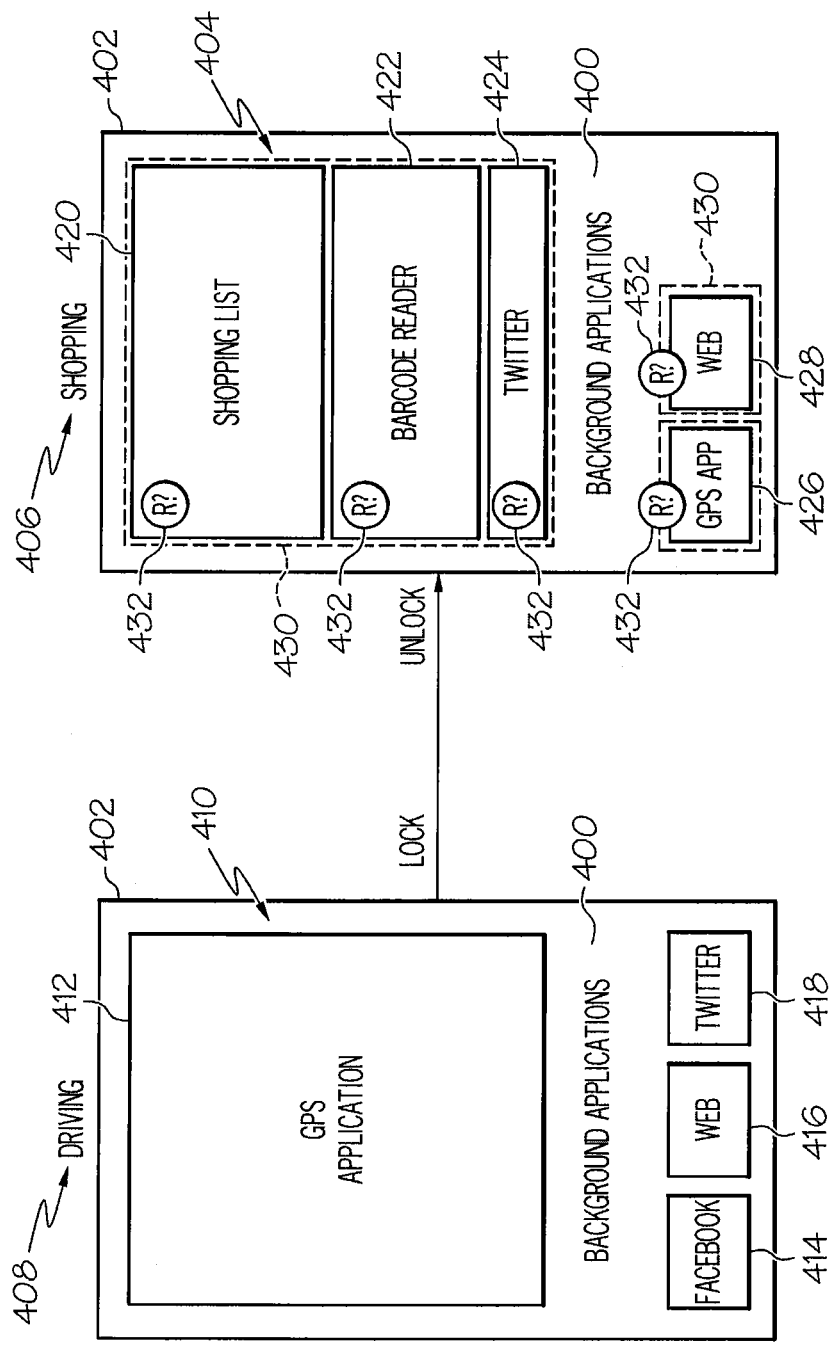
FIG. 4 is an example of a display of a mobile device presenting a recommendation of device usage settings based on the current context of the user having changed from a previous context when the device was locked or turned-off in accordance with an embodiment of the present invention.

FIG. 4 is an example of a display 400 of a mobile device 402 presenting an intelligent recommendation of device usage settings 404 based on a current context 406 of the user having changed from a previous context 408 when the device 402 was locked in accordance with an embodiment of the present invention. As illustrated in the example of FIG. 4 the previous context of the user 408 when the mobile device 402 was locked is "Driving." Also as illustrated in the example of FIG. 4, the device usage setting 410 of the device 402 includes the active or open applications or apps, GPS Application 412 and Background Applications: Facebook 414, Web browser 416 and Twitter 418. The mobile device 402 may then be locked or inactivated either manually by the user or automatically by timing out after a predetermined time period of inactivity by the user. The mobile device 402 may then be unlocked at a later time and a current context 406 of the user may be determined in response to the device 402 being unlocked or turned-on. As previously discussed, with reference to the method 100 of FIG. 1, the current context 406 of the user may be determined using a camera or cameras mounted in the device 402, other device sensors mounted in the device 402 or a combination of the cameras and other sensors. In the example illustrated in FIG. 4, the current context 406 of the user is determined to be "Shopping." Accordingly, an intelligent recommendation of device usage setting or settings 404 are presented on the display 400 based on the current context 406 of the user. The device usage settings 404 for the user context shopping 406 may include a Shopping List application 420, a Barcode Reader application 422, Twitter application 424 and Background Applications: GPS Application 426 and Web Browser Application 428. As previously described, different user contexts and associated device usage settings may be stored in a memory of the mobile device 402. The user may also be able to configure the user context and associated device user settings so that when a particular user context is determined, a particular or selected set of applications, options and settings defining the recommendation of device usage setting 404 may be presented on the display 400 of the device 402.

The recommendation of usage device setting 404 may be identified or distinguished as being a recommendation. For example, the recommended applications, options and settings may be highlighted or illustrated in a dimmer illumination on the display 400 or by some other distinguishing mechanism. This feature is illustrated by the broken lines 430 surrounding the recommended applications, options and settings in the example of FIG. 4. Additionally, or in another embodiment, an icon or symbol, such as the "R?" in a circle 432 or other icon or symbol associated with each recommended application, option and setting may be displayed to represent to the user that the application, option and setting are a recommendation of the device usage setting 404. Similar to that previously discussed, the user may then click-on or tap-on the icon 432 to select the recommended application, option or setting. The recommended application, option or setting may be closed or inactivated in response to the user clicking-on or tapping-on the icon 432 and the recommended application, option or setting may be selected for use and/or activated in response to the user clicking-on or tapping-on the area in the display 400 representing the application, option or setting outside of the icon 432. Alternatively, the recommended application, option or setting associated with the icon 432 may be selected for use and activated in response to the user clicking-on or tapping-on the icon 432 and the recommended application, option or setting associated with the icon 432 may be closed or inactivated in response to the user clicking-on or tapping-on the area illustrated in the display 400 as representing the recommended application, option or setting outside of the icon 432. In a further embodiment, the recommended applications, options and settings may automatically be activated without any action by the user or the user may configure the mobile device 402 to automatically activate the recommended usage device settings without user interaction.

Figure 5:
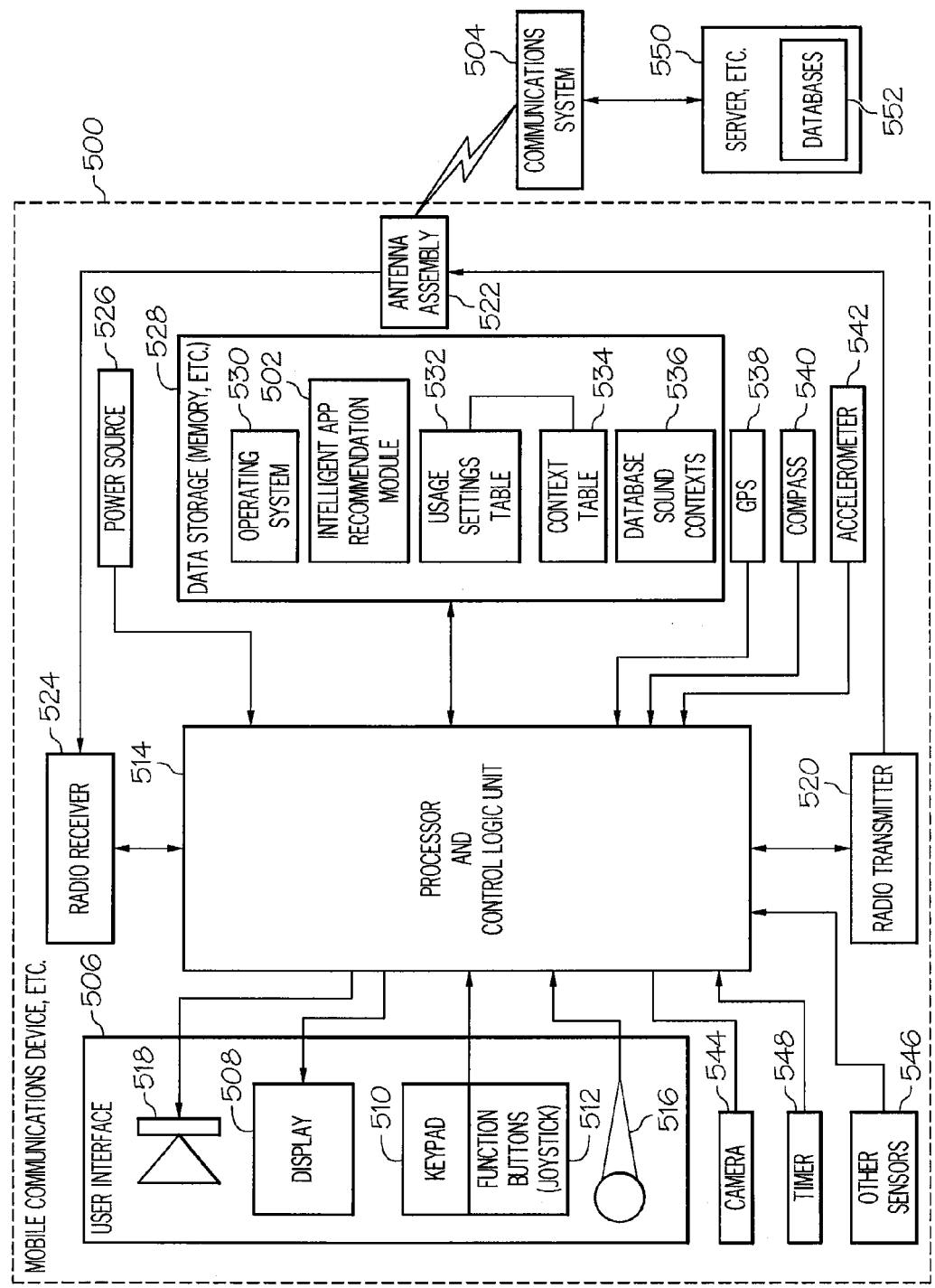
FIG. 5 is a block schematic diagram of an example of a mobile communications device including an intelligent application, option and setting recommendation module or feature in accordance with an embodiment of the present invention.

FIG. 5 is a block schematic diagram of an example of a mobile device 500 including an intelligent application, option and setting recommendation module 502 or feature in accordance with an embodiment of the present invention. The method 100 of FIG. 1 may be embodied in the intelligent application, option and setting recommendation module 502 or more simply intelligent application recommendation module 502 or feature. The functions and operations of the method 100 or similar operations may be performed by the device 500 in response to the intelligent application module 502 or feature running on the device 502. The different blocks, functions or operations of the method 100 may define different modules, sub-modules or units of the intelligent application recommendation module 502.

The mobile device 500 may operate on or communicate with other devices via a communications system 504. The communications system 504 may be a mobile, wireless or cellular communications system or similar system. The communications system 504 may include one or more terrestrial communications channels or links and one or more aerospace communications channels or links. In other embodiments, the communications system 504 may include or may be any communications system including by way of example, dedicated communications lines, telephone networks, wireless data transmission systems, two-way cable systems, customized computer networks, interactive kiosk networks and the like.

The mobile device 500 may include an operator or user interface 506 to facilitate controlling operation of the mobile device 500 including initiating and conducting phone calls and other communications and using applications operating on the mobile device 500. The user interface 506 may include a display 508 to provide visual signals to a subscriber or user as to the status and operation of the mobile device 500. The display 508 may be a liquid crystal display (LCD), light emitting diode (LED) or any other type of display capable of presenting color images. The display 508 may be a touch screen display. The display 508 may provide information to a user or operator in the form of images, text, numerals, characters, graphical user interfaces (GUIs) and the like. The user interface 506 may also include a keypad 510 and function keys or buttons 512 including a pointing device, such as a joystick, roller ball, touch pad or the like. The keypad 510, function buttons and pointing device 512 permit the user to communicate commands to the mobile device 500 to dial phone numbers, initiate and terminate calls, establish other communications, such as access to the Internet, send and receive email, text messages and the like and access and utilize other applications or apps on the mobile device 500. The keypad 510 and function buttons 512 may also be used to control other operations, features or functions of the device 500. If the display 508 is a touch screen, the mobile device 500 may not have a keypad 510 and function keys or buttons 512.

The display 508, keypad 510, and function buttons 512 may be coupled to a main processor and control logic unit 514. The main processor and control logic unit 514 may be a microprocessor or similar component. The main processor and logic unit 514 may include data structures, software programs, computer applications and the like to encode and decode control signals, perform communications procedures, run applications, and perform other functions as described herein.

The user interface 506 may also include a microphone 516 and a speaker 518 or speakers. The microphone 516 may receive audio or acoustic signals from a user or from any acoustic source. The microphone 516 may convert the audio or acoustic signals to electrical signals. As previously discussed, the microphone may receive sound or acoustic signals to determine a context of the user. The microphone 516 may be connected to the main processor and logic unit 514 wherein the main processor and logic unit 514 may convert the electrical signals to baseband communication signals. The main processor and control logic unit 514 may be connected to a transmitter 520 that may convert baseband signals from the main processor and control logic unit 514 to radio frequency (RF) signals. The transmitter 520 may be connected to an antenna assembly 522 for transmission of the RF signals to the communications system 504 or medium.

The antenna assembly 522 may receive RF signals over the air and transfer the RF signals to a receiver 524. The receiver 524 may convert the RF signals to baseband signals. The baseband signals may be applied to the main processor and control logic unit 514 which may convert the baseband signals to electrical signals. The processor and control unit 514 may send the electrical signals to the speaker 518 which may convert the electrical signals to audio signals that can be understood by the user. For data or other non-audio signals, such as short message service (SMS), email, text messaging or other data signals, the messages converted by the processor and control unit 514 may be presented on the display 508.

A power source 526 may be connected to the main processor and control logic unit 514 to provide power for operation of the mobile device 500. The power source 526 may be a rechargeable battery or the like.

The mobile device 500 may also include a data storage device 528, memory or file system. The data storage device 528 may be a computer-readable storage medium to store computer-executable or computer-usable instructions or data structures, such as data structures to perform special operations or functions such as those described in accordance with embodiments of the present invention.

An operating system 530 may be stored on the data storage device 528 for operation on the processor and control logic unit 514 to control operation of the mobile device 500.

The intelligent application recommendation module 502 may also be stored on the data storage device 528 for operation on the processor and control logic unit 514. As previously discussed, the method 100 described with reference to FIG. 1 may be embodied in the intelligent application recommendation module 502 and the functions and operations described with respect to the method 100 may be performed by the processor and control logic unit 514 when the module 502 is running or operating on the processor and control logic unit 514.

A usage settings table 532 and a context table 534 may also be stored on the data storage device 528. The usage settings table 532 may be similar to the table 300 described with reference to FIG. 3. The context table 534 may be similar to the context table 200 described with reference to FIG. 2.

A database 536 storing sounds in association with different contexts may also be stored on the data storage device 528. Similar to that previously discussed, sounds or acoustic signals received by the microphone 516 may be compared to sound contexts in the database 536 to facilitate determining a context of the user or a current activity or environment where the mobile device 500 may be located to facilitate determining a context of the user.

The mobile device 500 may also include a GPS 538, compass 540, accelerometer 542, camera 544 or cameras and other sensors 546. In addition to other operations that these components may perform, these components may also be used to facilitate determining a context of the user similar to that described herein.

The mobile device 500 may also include a timer 548 for tracking a predetermined time period of inactivity for locking the mobile device 500 as well as any other functions or operations of the mobile device 500 that may require tracking time or elapsed time.

The mobile device 500 may also access a server 550 or other entities via the communications system 504 to retrieve information or data that may be used by the mobile device 500 to facilitate determining a context of the user and further enhance use of the intelligent application recommendation module 502 or feature described herein. The server 550 may include a database 552 databases for storing data and other information that may be used in conjunction with the intelligent application recommendation feature of the present invention.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for making intelligent application and setting recommendations, comprising:
   determining, by a device, a current context of a user of the device in response to the device being one of unlocked and turned-on;
   determining, by the device, if the current context of the user has changed from a previous context of the user at a time when the device was one of locked and turned-off; and
   presenting a recommendation on a display of the device, the recommendation comprising at least one of an application for operation on the device, options for operation of the device, and operating settings of the device, based on the current context of the user, in response to determining that the current context of the user has changed from the previous context.

2. The method of claim 1, wherein determining, by the device, the current context of the user comprises determining a current activity in which the user is engaged.

3. The method of claim 1, wherein determining, by the device, the current context of the user comprises using a camera of the device and other sensory devices of the device to determine the current context of the user.

4. The method of claim 3, wherein using a camera of the device and other sensory devices of the device comprises at least one of:
   determining a geographic location of the device from a global positioning sensory device of the device;
   detecting movement of the device from an accelerometer in the device;
   determining a direction of movement of the device from a compass in the device;
   receiving sounds by a microphone of the device and comparing the received sounds to a database of sounds and corresponding contexts;
   determining a time of day from a clock of the device; and
   determining a local weather forecast at the geographic location of the device by activating a weather application of the device and automatically entering the geographic location of the device.

5. The method of claim 1, wherein determining, by the device, the current context of the user comprises:
   activating a camera of the device;
   collecting a plurality of images by the camera; and
   determining the current context of the user from the plurality of images.

6. The method of claim 1, wherein determining, by the device, if the current context of the user has changed from the previous context of the user comprises comparing the current context of the user to the previous context of the user.

7. The method of claim 1, further comprising determining a usage setting of the device.

8. The method of claim 7, wherein determining the usage setting of the device comprises at least one of:
   determining open applications;
   determining active background applications; and
   determining a user interface configuration of the device.

9. The method of claim 7, further comprising storing the usage setting of the device and an associated current context of the user.

10. The method of claim 9, further comprising:
    determining any change in the usage setting of the device; and
    storing a new usage setting of the device and the associated current context of the user.

11. The method of claim 9, further comprising configuring the device corresponding to the usage setting of the device when the device was one of locked and turned-off, in response to the current context of the user being determined to be unchanged when the device is one of unlocked and turned-on.

12. The method of claim 1, wherein presenting the recommendation on the display of the device comprises identifying each recommended application for operation on the communication device.

13. The method of claim 12, further comprising presenting an option for selecting each recommended application for one of operating the recommended application on the device and closing the recommended application.

14. The method of claim 13, further comprising:
    presenting an icon in association with each recommended application; and
    closing the recommended application in response to the icon being tapped on by the user.

15. The method of claim 14, further comprising opening or activating the recommended application on the device in response to the recommended application being tapped on by the user outside the icon.

16. A device, comprising:
    a processor;
    an intelligent application and settings recommendation module operable on the processor, wherein the intelligent application and settings recommendation module comprises:
        a module to determine a current context of a user of the device in response to the device being one of unlocked and turned-on;
        a module to determine if the current context of the user has changed from a previous context of the user at a time when the device was one of locked and turned-off; and
        a module to present a recommendation on a display of the device, the recommendation comprising at least one of an application for operation on the device, options for operation of the device, and operating settings of the device, based on the current context of the user, in response to determining that the current context of the user has changed from the previous context.

17. The device of claim 16, further comprising:
    a module to determine a usage setting of the device; and
    a file system to store the usage setting of the device with an associated current context of the user.

18. The device of claim 17, further comprising configuring the device corresponding to the usage setting of the device when the device was one of locked and turned-off, in response to the current context of the user being determined to be unchanged when the device is one of unlocked and turned-on.

19. A computer program product for making intelligent application and setting recommendations, the computer program product comprising:
    a non-transitory computer readable storage medium having computer readable program code embodied therewith, the computer readable program code comprising:
        computer readable program code configured to determine a current context of a user of a device in response to the device being one of unlocked and turned-on;
        computer readable program code configured to determine if the current context of the user has changed from a previous context of the user at a time when the device was one of locked and turned-off; and
        computer readable program code configured to present a recommendation on a display of the device, the recommendation comprising at least one of an application for operation on the device, options for operation of the device, and operating settings of the device, based on the current context of the user, in response to determining that the current context of the user has changed from the previous context.

20. The computer program product of claim 19, further comprising computer readable program code configured to configure the device corresponding to a usage setting of the device when the device was one of locked and turned-off, in response to the current context of the user being determined to be unchanged when the device is one of unlocked and turned-on.

* * * * *